Armstrong & King,
8812X
Grain Sifter.
Patented May 9. 1835.
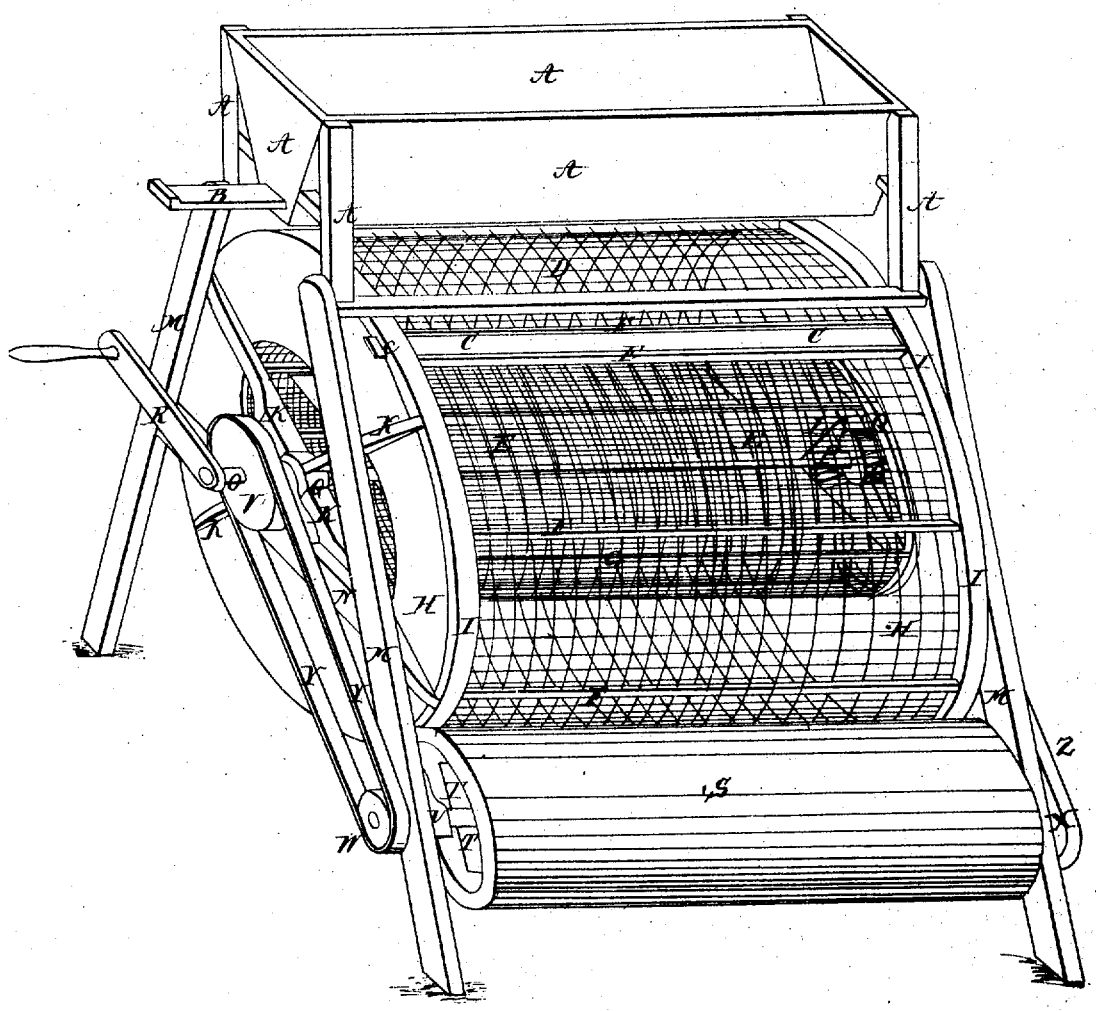

Martin N. Armstrong and William H. King
Letters Patent

The schedule referred to in these Letters Patent and making part of the same containing a description in the words of the said Martin N. Armstrong and William H. King themselves of their improvements in Machinery for sifting and Cooling grain and berries of all kinds.

To all to whom these presents shall come — Be it known that we Martin N. Armstrong and William H. King both of the City and County of New York and State of New York have jointly invented a new and useful improvement in machinery for sifting and cooling grain and berries of all kinds and descriptions whatsoever and that the following is a full and exact description of the said Machinery as invented and improved by us. The invention and improvement aforesaid for the purposes aforesaid embraces and consists of a cylinder sifter and cooler formed and constructed in the manner following. that is to say. a cylinder is formed covered and bounded on its circular surface or boundary by wire or other network or netting of such strength, constructions and proportions as may be required by the particular kind or description of grain or berries to be sifted or cooled. the said cylinder is divided into two apartments by similar net work of like strength, construction and proportions, placed and being in a cylindric form or shape within and parallel to the said outer covering or boundary and forming a smaller cylindric apartment within the larger and outer apartment. the said net-work is in both instances secured guarded and strengthened by bars of wood or metal placed and being lengthways with the said cylinder and at both ends thereof affixed and secured to rims or fellies of wood

8812X or metal which protect the end edges of the said net-work respectively and to which bars the said net work is secured. The extremities or ends of the said outer apartment of the said cylinder are closed or bounded by circular end plates or pieces of wood or metal of the same diameter as the said cylinder from the middle of which end plates respectively a circular piece is cut out of sufficient size and dimensions to leave entirely open the ends or extremities of the said inner apartment of the said cylinder. the said ends plates are strengthend guarded and secured respectively by arms of wood or metal, crossing each other at the centre of each of the said end plates respectively where they are secured in journals or bearings of wood or metal, and which arms respectively run and extend at the ends thereof to the circumference of the said end plates. On the outer circular surface or boundary of the said outer apartment of the said cylinder an open space is left being the entire space between two of the bars which secure the said outer network as aforesaid. the sides of which last mentioned two bars next to and bounding the said open space are so grooved that a cover made of wood or metal or of net work cased in wood or metal may slide freely and securely in and between the said grooved sides of the said bars thus forming an opening to the said outer apartment of the said cylinder. which may be closed or opened at pleasure. The said inner apartment of the said cylinder is occupied by a fan called or distinguished as the upper fan, composed of a shaft to which are affixed and secured at alternate right angles to each other, four thin plates of wood or metal of such length and depth as will permit them to revolve upon the said shaft freely and with as much effect as may be within the said inner apartments of the said cylinder. The said cylinder der is attached to and supported by an oblong frame of
wood or metal consisting of four legs sufficiently secured to-
gether by cross bars on each of the sides and ends thereof res-
pectively. with and to this frame the said cylinder is joined
connected and attached on one extremity thereof by a short
solid round shaft which passes through and revolves free-
ly within a sufficient bearing and journal in a cross bar
on the corresponding end of the said frame, and which is firm
ly secured to the said journal or bearing of the said arms of
that end of the said cylinder and on the other extremity
of the said cylinder by a short round shaft which is firm-
ly affixed and secured to the said journal or bearing of the
said arms of the last named extremity of the said cylinder;
and which last named shaft passes through and revolves
freely within a sufficient journal in a cross bar of the cor-
responding end of the said frame. Through the middle of
the last named shaft is a round hole or bore, parallel to
its surface and of sufficient diameter to allow the said
shaft of the said upper fan to work or revolve freely
within it. On one side of the said frame and near the
feet thereof is affixed an oblong cylinderic case of wood
or metal placed and being parallel to the said cylinderic
sifter and cooler, and of sufficient dimensions to contain within
it a fan called or distinguished as the lower fan, of similar
size construction and dimensions as the said upper fan
herein before described the said case is of the same length
as the said cylinder and is closed in by a close covering
a boundary on all directions except that portion of its
circular surface opposite and immediately next to the
said cylinderic sifter and cooler, which last named por-
tion of its oblong surface is open and through which the cur-
rent of air caused by the revolving of the said lower fan passes
directly against the said outer net work of the said cylinder.

8812X

The said lower fan revolves upon a shaft pafsing through the
centre of the end plates of the said case respectively, where the said
shaft revolves or works freely within sufficient journals or
bearings. To the ends of the said shaft out side the said case
two round pullies of wood or metal and of unequal diam-
eters. the smaller of the said pullies being on the end of the
said frame where is the short round solid shaft of the said cyl-
inder aforesaid. and the larger thereof at the opposite end of
the said frame where is the said short round shaft of the said
cylinder bored in the middle thereof, as before mentioned.
The said cylinder is worked or set in motion by a crank
(or other power which may be applied) attached to the said
short solid shaft of the said cylinder. To the said last
named shaft between the said crank and the said crofs
bar in which it has its bearing, a round pully of wood
or metal is affixed and secured on a line with the said
smaller pully of the said lower fan and which is as much
larger than the said smaller pully of the said lower fan
as the as the increase of velocity desired to be given to the said
lower fan over the said cylinder may require; The said pul-
ly of the said short solid shaft is connected with and acts
upon the said smaller pully of the said lower fan. which
when the crank or other power as may be, turns the said
short solid shaft and its pully, acts upon and turns the
said smaller pully of the said lower fan in the same direc-
tion and with as much greater velocity, as the difference between
the diameters of the said pullies will cause. On the other end
of the said shaft of the said lower fan. the said larger
pully necefsarily revolves with the same velocity as the said
smaller pully thereof just described, and by means of a
connecting strap is connected with and acts upon a smal-
ler round pully affixed and secured to the said shaft
of the said upper fan on a line with the said larger pully
of of the said lower fan. The difference in diameter between
the said pullies of the said lower fan and also between the
larger thereof and the said pully affixed to the shaft of
the upper fan must be regulated by the increase of velocity
desired to be given to the said upper fan over the said lower
fan. The said shaft of the said fan is set in motion by and
revolves with the said pully thereunto affixed and passes out
through and revolves freely within the aforementioned bore
in the said short round shaft of the said cylinder placed
and being at that end thereof, and has its own journal
and bearing in an outer cross bar at that end of the said
frame, and at its opposite end or extremity rests upon and revolves
freely within a bearing in the inner end of the said short
solid shaft which there supports the said cylinder and con-
nects it with the said frame as aforementioned. The said
connecting strap last aforesaid is crossed between the said
pullies which it connects as aforesaid so that thereby
the motion given to the said upper fan as aforesaid is op-
posite to the motion given to the said cylinder and the
said lower fan as aforesaid the revolutions of the said upper
fan being directly reverse to the revolutions of the said cylin-
der and the said lower fan. The said upper fan moves
or revolves with as much greater velocity than the said low-
er fan as the difference in diameter of the said pullies will
cause as aforesaid The motions aforesaid may also be
obtained by connected rods or cogwheels used in the
place of the aforesaid connecting straps and pullies. The
crank or other power aforementioned may also be applied
to the said short bored shaft of the said cylinder, or to the said
shaft of the said lower fan or to the said shaft of the said
upper fan. A moveable hopper with a sliding bottom or
opening corresponding to the said opening in the said outer
network of the said cylinder fits and slides with wheels
or or castors upon the upper part or top of the said frame di-
rectly over the said cylinder this hopper being filled with
grain or berries is easily fitted to its place over the said cyl-
inder as aforesaid. the open space aforesaid in the outer net-
work of the said cylinder closed by a sliding cover as aforesaid
is turned up and directly under the said hopper. The said
sliding cover thereof is drawn out. the sliding bottom of the
said hopper is also drawn out and the grain or berries in
the said hopper fall into the outer apartment of the said
cylinder, the sliding cover of the said cylinder is driven
home and the crank or other power, as may be putting the
said cylinder in rapid motion the said grain or berries are
necessarily kept in rapid and continual motion upon and
against the inner surface of the said outer net work of
the said cylinder, and at the same time the said lower
fan forces a current of air directly up against and through
the said outer net-work and the said upper fan, revolving
in the opposite direction and with much greater velocity
forces a stronger current of air upon and against the said
grain or berries. and continually in a manner opposed [illegible]
resists the motion given to them by the said cylinder as afore-
said. By these means the said grain or berries are speedily
sifted and cleaned and if hot or heated are also speedily cool-
ed. When sifted and cooled the said grain or berries pass
out of and from the said cylindric sifter and cooler.
by withdrawing the said sliding cover of the said cylinder.
And we the said Martin A. Armstrong and William H.
King have hereunto annexed a drawing of the machinery
herein before described as and for part and parcel of this our
specification and description of the said machinery invention
and improvement and have to the several parts thereof respective-
ly annexed certain letters as and for letters and marks of
reference to represent or indicate the several and respective
parts arts of the said Machinery as represented in the said draw-
ings in the following explanation or description of the said
rawing to wit A. represents or indicates the said moveable
opper. B. represents or indicates the sliding bottom thereof.
C. represents or indicates the said sliding cover of the said open
pace in the said outer net work. D. represents or indicates the
aid outer net work. E represents or indicates the said inner
et work. F represents or indicates the said bars which are
ffixed to the said outer net-work as aforesaid. G. represents
r indicates the said bars which affixed to the said inner
net work as aforesaid. H represents or indicates the said
end plates of the said outer apartment of the said cylinder.
I represents or indicates the said rims or fellies which
protect the end edges of the said net work respectively
as aforesaid. K represents or indicates the said arms which
strengthen and are affixed to the said end plates as afore-
said. L represents the said plates of the said upper fan.
M. represents or indicates the said legs of the said frame.
N represents or indicates the said cross bars of the said frame.
O. represents or indicates the said short solid shaft of the said cyl-
inder. P represents or indicates the said shaft of the said upper
fan. Q represents or indicates the said journals or bearings
of the said arms of the said end plates. R. represents or in-
dicates the said crank affixed to the said short shaft as afore-
said. S. represents or indicates the said case of the said lower
fan T. represents or indicates the plates of the said lower
fan. U represents or indicates the said shaft of the said
lower fan V represents or indicates the said pully of the said
short solid shaft of the said cylinder. W represents or indi-
cates the said smaller pully of the said lower fan. X rep-
resents or indicates the said larger pully of the said lower fan.
Y represents or indicates the said connecting strap which
connects the said pully of the said short solid shaft with
the

8812X the said smaller pully of the said lower fan as aforesaid.
Z represents or indicates the said connecting strap which
connects the said larger pully of the said lower fan with the
said pully of the said shaft of the said upper fan as aforesaid.
a represents or indicates the said pully of the said shaft of
the said upper fans. The said short round shaft of the said cyl-
inder bored in the middle thereof as aforesaid does not ap-
pear on the said drawing but would if appearing thereon
be seen between the said journal or bearing on the right
hand side of said drawing marked Q. and the said pully
of the said shaft of the said upper fan marked a. And we
the said Martin N. Armstrong and William H. King do
say and claim that we are the joint and original inven-
tors of the machinery herein before described and set forth for
the purposes herein before set forth except only that the said
cylinder herein before described hath been heretofore known and
patented without the opening or sliding cover herein before men-
tioned and described but with openings in the ends or extrem-
ities thereof and except also that fans, frames, cases, pullies, shafts,
cranks, hoppers, connecting straps or other component parts
of the said machinery herein before described and set forth
may have heretofore been used separately. but we say and
claim that we are the joint and original inventors of the
combination and uses of the said component parts for the pur-
poses aforesaid as herein before described and set forth Witnesses
A Tucker
Elisha Morrill Martin N. Armstrong
Wm H. King (~~Drawings~~)

Exd.
[illegible]

2805